United States Patent
Breckenridge et al.

(10) Patent No.: US 8,489,632 B1
(45) Date of Patent: Jul. 16, 2013

(54) PREDICTIVE MODEL TRAINING MANAGEMENT

(75) Inventors: Jordan M. Breckenridge, Menlo Park, CA (US); Travis H. K. Green, New York, NY (US); Wei-Hao Lin, New York, NY (US); Gideon S. Mann, New York, NY (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/171,423

(22) Filed: Jun. 28, 2011

(51) Int. Cl.
*G06F 17/30* (2006.01)

(52) U.S. Cl.
USPC ............ 707/778; 707/776; 707/777; 707/810

(58) Field of Classification Search
CPC .............. G06F 17/2247; G06F 17/2241; G06F 17/2735; G06F 17/277; G06F 17/30067
See application file for complete search history.

(56) References Cited

U.S. PATENT DOCUMENTS

| | | | | |
|---|---|---|---|---|
| 5,386,373 A * | 1/1995 | Keeler et al. | .................. | 700/266 |
| 5,479,573 A * | 12/1995 | Keeler et al. | ..................... | 706/21 |
| 5,583,968 A * | 12/1996 | Trompf | .......................... | 704/232 |
| 5,586,221 A * | 12/1996 | Isik et al. | ......................... | 706/23 |
| 5,608,842 A * | 3/1997 | Broese et al. | .................... | 706/23 |
| 5,727,128 A * | 3/1998 | Morrison | ........................ | 706/45 |
| 5,752,007 A * | 5/1998 | Morrison | .......................... | 703/2 |
| 5,806,022 A * | 9/1998 | Rahim et al. | .................. | 704/205 |
| 5,862,513 A * | 1/1999 | Mezzatesta et al. | .............. | 702/9 |
| 5,963,653 A * | 10/1999 | McNary et al. | ............... | 382/103 |
| 5,970,426 A * | 10/1999 | Mandel et al. | .................. | 702/32 |
| 6,003,003 A * | 12/1999 | Asghar et al. | .................. | 704/243 |
| 6,038,528 A * | 3/2000 | Mammone et al. | ........... | 704/203 |
| 6,042,548 A * | 3/2000 | Giuffre | .......................... | 600/483 |
| 6,092,919 A * | 7/2000 | Calise et al. | ..................... | 700/45 |
| 6,112,126 A * | 8/2000 | Hales et al. | ...................... | 700/29 |
| 6,144,952 A * | 11/2000 | Keeler et al. | ..................... | 706/21 |
| 6,202,049 B1 * | 3/2001 | Kibre et al. | ................... | 704/267 |
| 6,453,308 B1 * | 9/2002 | Zhao et al. | ....................... | 706/21 |
| 6,498,993 B1 * | 12/2002 | Chen et al. | ...................... | 702/35 |
| 6,519,534 B2 * | 2/2003 | Chen et al. | ...................... | 702/34 |
| 6,542,852 B2 * | 4/2003 | Chen et al. | ..................... | 702/182 |
| 6,687,696 B2 * | 2/2004 | Hofmann et al. | ..................... | 1/1 |

(Continued)

OTHER PUBLICATIONS

Duchi, John, et al., "Boosting with Structural Sparsity", 2009, cs.berkeley.edu [online]. [Retrieved on Nov. 25, 2011]. Retrieved from the Internet: <URL: http://www.cs.berkeley.edu/~jduchi/projects/DuchiSi09d.pdf>, 41 pages.

(Continued)

*Primary Examiner* — Farhan Syed
(74) *Attorney, Agent, or Firm* — Fish & Richardson P.C.

(57) ABSTRACT

Methods, systems, and apparatus, including computer programs encoded on one or more computer storage devices, for receiving training data for predictive modeling and executing multiple processes simultaneously to generate multiple trained predictive models using the training data and training functions. After executing the processes for an initial runtime, a convergence status of each process is determined that indicates a likelihood that the training function being executed will converge on the training data. Based on the determination, training functions are identified that are not likely to converge and processes that are executing these training functions are terminated. After an ultimate runtime has expired, processes that are still executing training functions that have not yet converged are terminated. An effectiveness score is generated for each of the trained predictive models that were successfully generated and a trained predictive model is selected based on the effectiveness scores.

27 Claims, 8 Drawing Sheets

U.S. PATENT DOCUMENTS

| | | | |
|---|---|---|---|
| 6,741,756 B1* | 5/2004 | Toyama et al. | 382/291 |
| 7,039,475 B2* | 5/2006 | Sayyarrodsari et al. | 700/31 |
| 7,124,054 B2* | 10/2006 | Kim et al. | 702/181 |
| 7,184,845 B2* | 2/2007 | Sayyarrodsari et al. | 700/31 |
| 7,349,919 B2 | 3/2008 | Russell et al. | |
| 7,599,749 B2* | 10/2009 | Sayyarrodsari et al. | 700/28 |
| 7,630,868 B2* | 12/2009 | Turner et al. | 703/2 |
| 7,643,989 B2* | 1/2010 | Deng et al. | 704/209 |
| 7,788,195 B1* | 8/2010 | Subramanian et al. | 706/20 |
| 8,244,651 B1* | 8/2012 | Lin et al. | 706/14 |
| 8,250,009 B1* | 8/2012 | Breckenridge et al. | 706/14 |
| 2002/0038197 A1* | 3/2002 | Chen et al. | 702/182 |
| 2002/0052699 A1* | 5/2002 | Chen et al. | 702/34 |
| 2003/0212851 A1 | 11/2003 | Drescher et al. | |
| 2004/0117040 A1* | 6/2004 | Sayyarrodsari et al. | 700/29 |
| 2004/0130276 A1* | 7/2004 | Sayyarrodsari et al. | 315/501 |
| 2005/0234753 A1 | 10/2005 | Pinto et al. | |
| 2005/0288868 A1* | 12/2005 | Duffy | 702/19 |
| 2006/0179019 A1* | 8/2006 | Bradski | 706/20 |
| 2007/0150424 A1* | 6/2007 | Igelnik | 706/15 |
| 2007/0198104 A1* | 8/2007 | Sayyarrodsari et al. | 700/44 |
| 2008/0071394 A1* | 3/2008 | Turner et al. | 700/31 |
| 2009/0106178 A1 | 4/2009 | Chu | |
| 2010/0161531 A1* | 6/2010 | Duffy | 706/13 |
| 2012/0166156 A1* | 6/2012 | Meng et al. | 703/2 |
| 2012/0191630 A1* | 7/2012 | Breckenridge et al. | 706/12 |
| 2012/0191631 A1* | 7/2012 | Breckenridge et al. | 706/12 |

OTHER PUBLICATIONS

Duchi, John, et al., "Boosting with Structural Sparsity", Proceedings of the 26th International Conference on Machine Learning, Montreal, Canada, 2009, cs.berkeley.edu [online]. [Retrieved on Nov. 25, 2011]. Retrieved from the Internet: <URL: http://www.cs.berkeley.edu/~jduchi/projects//DuchiSi09a.pdf>, 8 pages.

"Google Prediction API (*Labs*)", Google.com, [Retrieved on May 4, 2011]. Retrieved from the Internet: <URL: http://code.google.com/apis/predict/>, 21 pages.

R-Project web pages, [online] [retrieved on May 18, 2010]. Retrieved from the Internet: <URL: http://www.r-project.org/>. 190 pages.

Uclassify web pages, [online] [retrieved on May 18, 2010]. Retrieved from the Internet: <URL: http://www.uclassify.com/>. 16 pages.

Zementis web pages, [online] [retrieved on May 18, 2010]. Retrieved from the Internet: <URL: http://www.zementis.com/>, 34 pages.

Weiss, Integrating Real-Time Predictive Analytics into SAP Applications [online], Dec. 30, 2009 [retrieved on Sep. 29, 2011], Retrieved from the Internet: ,URL:http://www.sdn.sap.com/irj/scn/go/portal/prtroot/docs/library/uuid/a07faefd-61d7-2c10-bba6-89ac5ffc302c?QuickLink=index&overridelayout=true>, 1 page.

Hutter, et al., "Performance Prediction and Automated Tuning of Randomized and Parametric Algorithms,", Principles and Practice of Constraint Programing, Lecture Notes in Computer Science, 2006, 15 pages.

SAS Rapid Predictive Modeler, Overview, 2010, 4 pages.

Postema, et al., "A Decision Support Tool for Tuning Parameters in a Machine Learning Algorithm", Nanyang Techonological University, 1997, 9 pages.

"Active learning (machine learning)," Wikipedia, the free encyclopedia, [online] [retrieved on Sep. 8, 2011]. Retrieved from the Internet: http://en.wikipedia.org/wiki/Active learning (machine learning), 3 pages.

* cited by examiner

PREDICTIVE MODEL TRAINING MANAGEMENT

TECHNICAL FIELD

This specification relates to training and selecting predictive models.

BACKGROUND

Predictive analytics generally refers to techniques for extracting information from data to build a model that can predict an output from a given input. Predicting an output can include predicting future trends or behavior patterns, or performing sentiment analysis, to name a few examples. Various types of predictive models can be used to analyze data and generate predictive outputs. Typically, a predictive model is trained with training data that includes input data and output data that mirror the form of input data that will be entered into the predictive model and the desired predictive output, respectively. The amount of training data that may be required to train a predictive model can be large, e.g., in the order of gigabytes or terabytes. The number of different types of predictive models available is extensive, and different models behave differently depending on the type of input data. Additionally, a particular type of predictive model can be made to behave differently, for example, by adjusting the hyper-parameters or via feature induction or selection.

SUMMARY

In general, in one aspect, the subject matter described in this specification can be embodied in a computer-implemented method that includes receiving training data for predictive modeling and executing multiple processes simultaneously in parallel to generate multiple trained predictive models using the training data and multiple training functions. After executing the processes for an initial runtime, a convergence status of each process is determined, wherein the convergence status indicates a likelihood that the training function being executed by the process will converge on the training data. Based on the determination, one or more training functions are identified that are not likely to converge. Processes that are executing the identified one or more training functions are terminated and processes for remaining training functions are allowed to continue. After an ultimate runtime has expired, processes that are still executing training functions that have not yet converged are terminated. An effectiveness score is generated for each of the trained predictive models that were generated by training functions that successfully converged on the training data. The effectiveness score for a particular trained predictive model represents an estimation of the effectiveness of the particular trained predictive model. A first trained predictive model is selected from among the trained predictive models based on their respective effectiveness scores. Other embodiments of this aspect include corresponding systems and computer programs recorded on computer storage devices, each configured to perform the operations described above.

These and other embodiments can each optionally include one or more of the following features, alone or in combination. The training data can be received from a client computing system over a network and access to the client computing system to the first trained predictive model can be provided over the network. Determining a convergence status for each process can include: determining a difference between two or more training iterations and comparing the difference to a predetermined threshold value; and if the difference exceeds the threshold value, then the training function is determined to be unlikely to converge and if the difference is less than the threshold value then the training function is determined to be likely to converge. In some implementations, the difference is a percentage change between two iterations and the predetermined threshold value is expressed as a percentage change. In some implementations, the difference is an absolute numerical value change between two iterations and the predetermined threshold value is expressed as a numerical value.

After an ultimate runtime has expired but before terminating processes that are still executing training functions that have not yet converged, the method can further include: for each process that is still executing a training function that has not yet converged, determining an estimated runtime to convergence for the training function for training data having a same type as the received training data; and if for each process the estimated runtime to convergence is less than the ultimate runtime, then terminating the process and if for each process the estimated runtime to convergence is greater than the ultimate runtime then extending a runtime for the process.

In some implementations, after an ultimate runtime has expired but before terminating processes that are still executing training functions that have not yet converged, the method can further include, for each process still executing a training function: determining a difference between two or more training iterations and comparing the difference to a predetermined threshold value; and if the difference exceeds the threshold value, then terminating the process and if the difference is less than the threshold value then extending a runtime for the process.

Generating an effectiveness score for each of the trained predictive models can include: partitioning the training data into k partitions, performing k-fold cross-validation and generating a cross-validation score for each of the trained predictive models that indicates the effectiveness of the trained predictive model, where k is an integer greater than 1.

One or more updateable trained predictive models can be obtained from a predictive model repository, wherein the received training data is different than initial training data that was used with one or more training functions to train the one or more updateable trained predictive models. Executing the processes simultaneously in parallel to generate the trained predictive models using the training data and training functions can include executing one or more processes to generate one or more retrained predictive models using the training data, the one or more updateable trained predictive models and the one or more training functions used to train said updateable trained predictive models.

Particular embodiments of the subject matter described in this specification can be implemented so as to realize one or more of the following advantages. Multiple training functions can be executed, even those that may not complete, which can improve accuracy in the trained predictive model ultimately selected. The multiple training functions can be executed in parallel, thereby saving on overall runtime as compared to executing in series. Memory can also be saved because the training functions will complete executing at approximately the same time and a trained predictive model can be selected from the multiple trained predictive models thereby generated. By contrast, if the training functions are executed serially, the multiple trained predictive models that are generated have to be stored in memory at least until the last training function has executed before one is selected, thereby using up memory resources for a longer time period.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Methods and systems are described that provide a dynamic repository of trained predictive models, at least some of which can be updated as new training data becomes available. A trained predictive model from the dynamic repository can be provided and used to generate a predictive output for a given input. As a particular client entity's training data changes over time, the client entity can be provided access to a trained predictive model that has been trained with training data reflective of the changes. As such, the repository of trained predictive models from which a predictive model can be selected to use to generate a predictive output is "dynamic", as compared to a repository of trained predictive models that are not updateable with new training data and are therefore "static".

Figure 1:
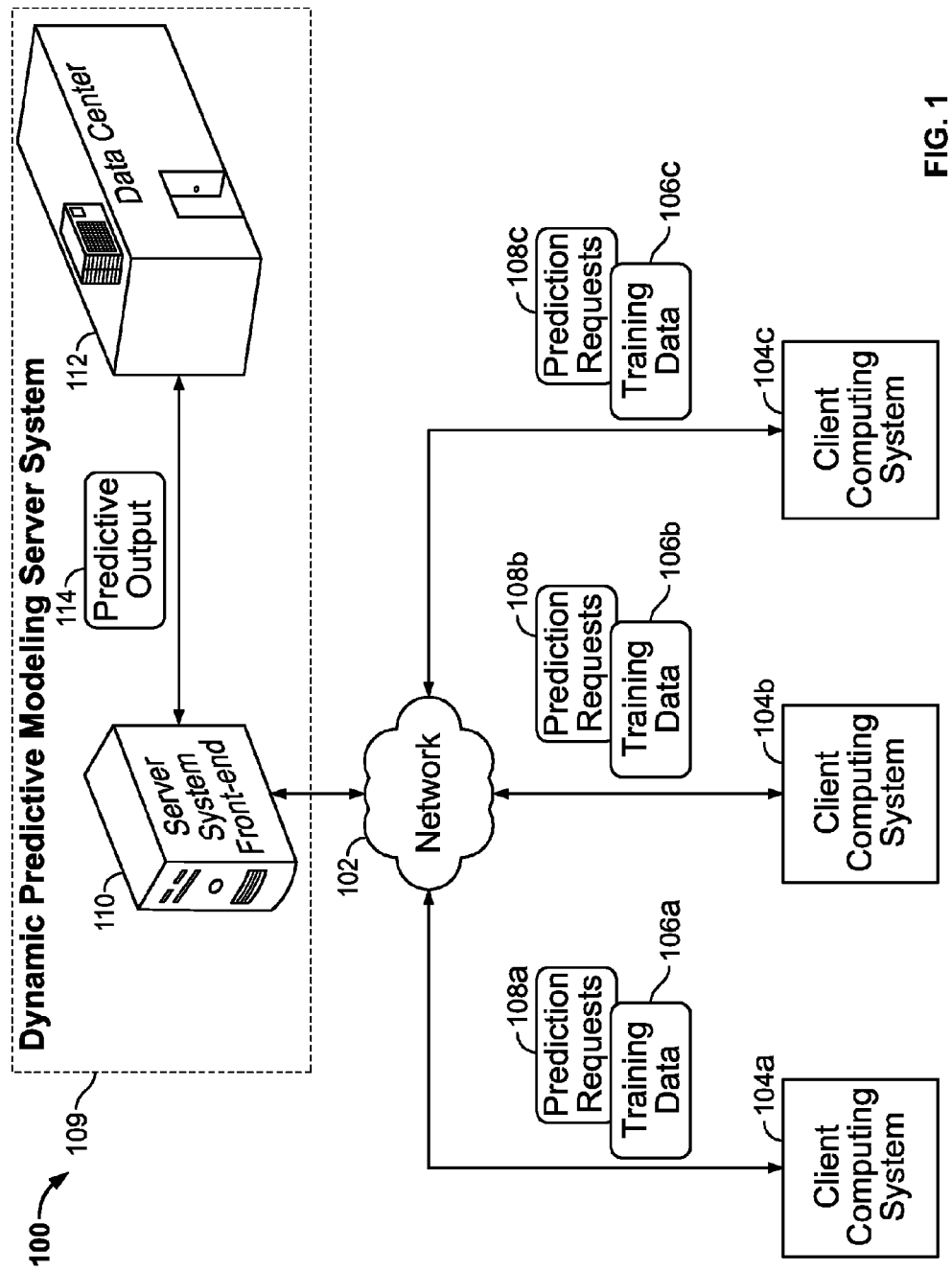
FIG. 1 is a schematic representation of a system that provides a predictive analytic platform.

FIG. 1 is a schematic representation of a system that provides a predictive analytic platform. The system 100 includes multiple client computing systems 104a-c that can communicate with a predictive modeling server system 109. In the example shown, the client computing systems 104a-c can communicate with a server system front end 110 by way of a network 102. The network 102 can include one or more local area networks (LANs), a wide area network (WAN), such as the Internet, a wireless network, such as a cellular network, or a combination of all of the above. The server system front end 110 is in communication with, or is included within, one or more data centers, represented by the data center 112. A data center 112 generally is a large numbers of computers, housed in one or more buildings, that are typically capable of managing large volumes of data.

A client entity—an individual or a group of people or a company, for example—may desire a trained predictive model that can receive input data from a client computing system 104a belonging to or under the control of the client entity and generate a predictive output. To train a particular predictive model can require a significant volume of training data, for example, one or more gigabytes of data. The client computing system 104a may be unable to efficiently manage such a large volume of data. Further, selecting and tuning an effective predictive model from the variety of available types of models can require skill and expertise that an operator of the client computing system 104a may not possess.

The system 100 described here allows training data 106a to be uploaded from the client computing system 104a to the predictive modeling server system 109 over the network 102. The training data 106a can include initial training data, which may be a relatively large volume of training data the client entity has accumulated, for example, if the client entity is a first-time user of the system 100. The training data 106a can also include new training data that can be uploaded from the client computing system 104a as additional training data becomes available. The client computing system 104a may upload new training data whenever the new training data becomes available on an ad hoc basis, periodically in batches, in a batch once a certain volume has accumulated, or otherwise. The system 100 also allows training data 106b and training data 106c to be uploaded from the client computing system 104b and the client computing system 104c, respectively.

The server system front end 110 can receive, store and manage large volumes of data using the data center 112. One or more computers in the data center 112 can run software that uses the training data to estimate the effectiveness of multiple types of predictive models and make a selection of a trained predictive model to be used for data received from the particular client computing system 104a. The selected model can be trained and the trained model made available to users who have access to the predictive modeling server system 109 and, optionally, permission from the client entity that provided the training data for the model. Access and permission can be controlled using any conventional techniques for user authorization and authentication and for access control, if restricting access to the model is desired. The client computing systems 104a, 104b, 104c can transmit prediction requests 108a, 108b, 108c over the network. The selected trained model executing in the data center 112 receives the prediction request, input data and request for a predictive output, and generates the predictive output 114. The predictive output 114 can be provided to the client computing system 104a, for example, over the network 102.

Advantageously, when handling large volumes of training data and/or input data, the processes can be scaled across multiple computers at the data center 112. The predictive modeling server system 109 can automatically provision and allocate the required resources, using one or more computers as required. An operator of the client computing system 104a is not required to have any special skill or knowledge about predictive models. The training and selection of a predictive model can occur "in the cloud", i.e., over the network 102, thereby lessening the burden on the client computing system's processor capabilities and data storage, and also reducing the required client-side human resources.

The term client computing system is used in this description to refer to one or more computers, which may be at one or more physical locations, that can access the predictive modeling server system. The data center 112 is capable of handling large volumes of data, e.g., on the scale of terabytes or larger, and as such can serve multiple client computing systems. For illustrative purposes, three client computing systems 104a-c are shown, however, scores of client computing systems can be served by such a predictive modeling server system 109.

Figure 2:
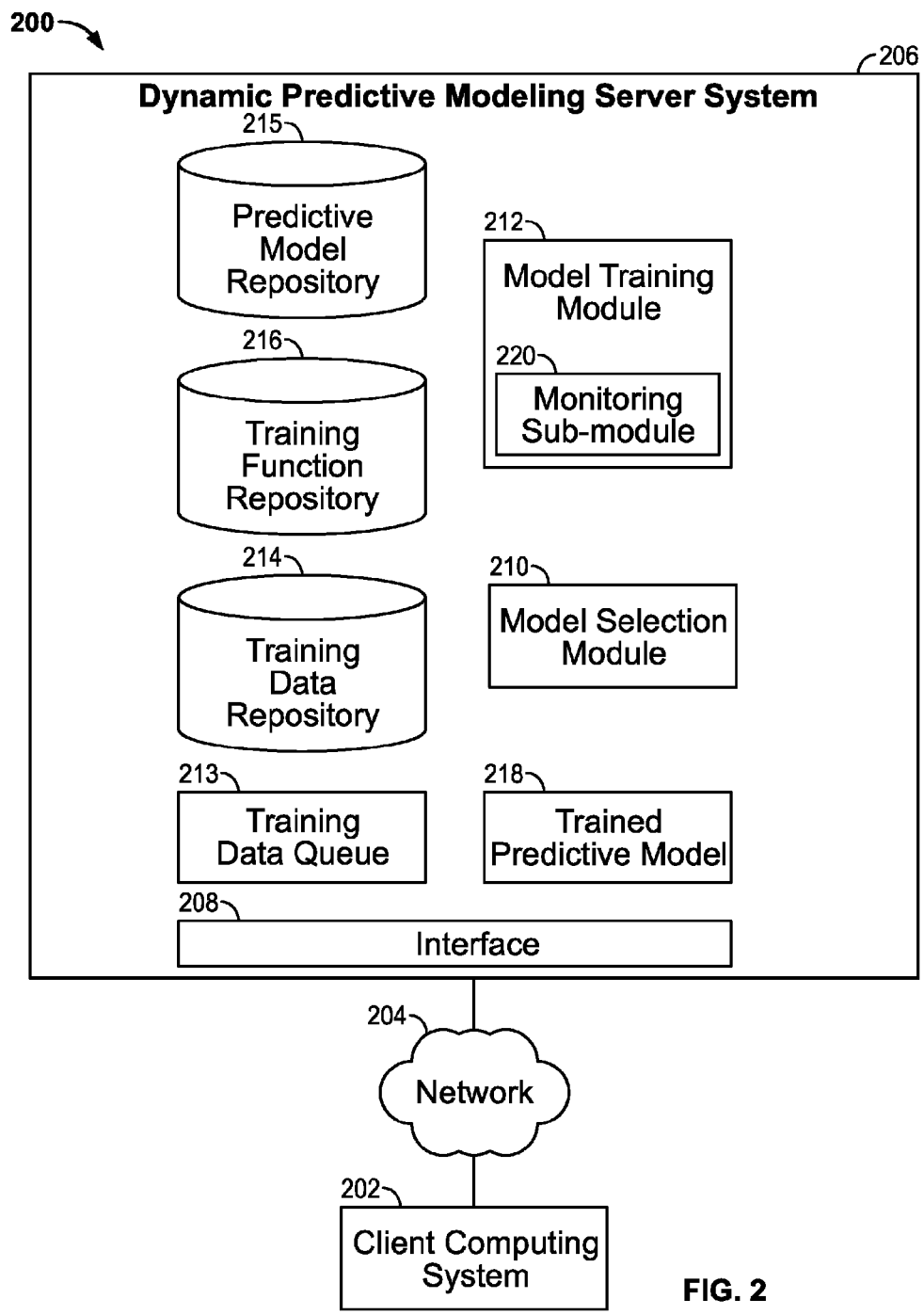
FIG. 2 is a schematic block diagram showing a system for providing a predictive analytic platform over a network.

FIG. 2 is a schematic block diagram showing a system 200 for providing a dynamic predictive analytic platform over a network. For illustrative purposes, the system 200 is shown with one client computing system 202 communicating over a network 204 with a predictive modeling server system 206. However, it should be understood that the predictive modeling server system 206, which can be implemented using multiple computers that can be located in one or more physical locations, can serve multiple client computing systems. In the example shown, the predictive modeling server system includes an interface 208. In some implementations the interface 208 can be implemented as one or more modules adapted to interface with components included in the predictive modeling server system 206 and the network 204, for example, the training data queue 213, the training data repository 214, the model selection module 210 and/or the trained model repository 218.

Figure 3:
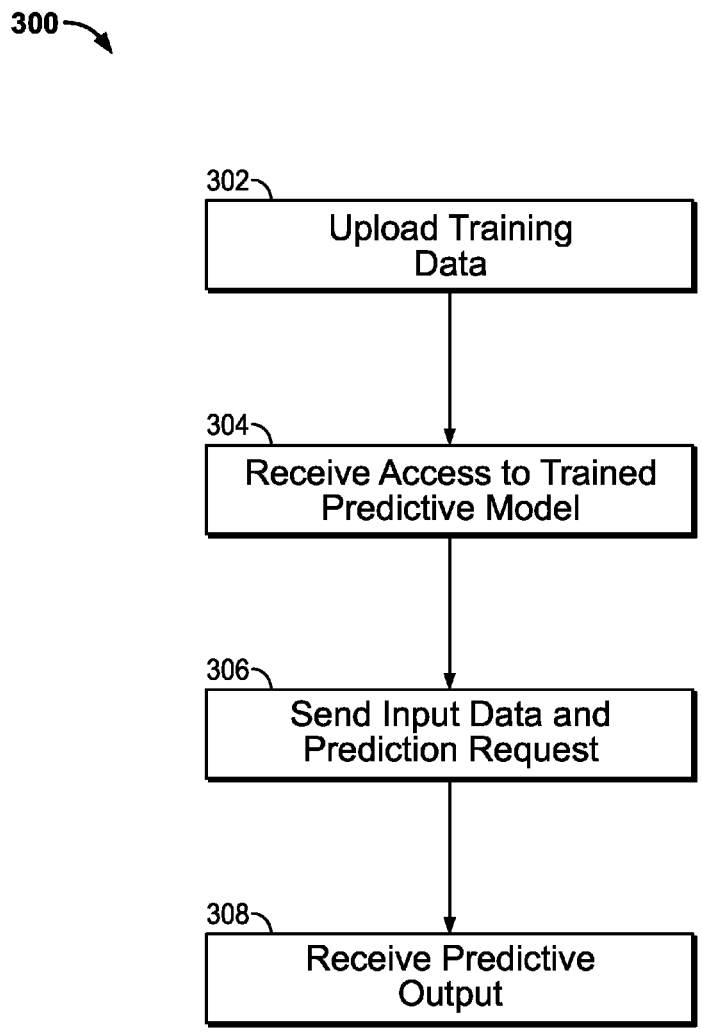
FIG. 3 is a flowchart showing an example process for using the predictive analytic platform from the perspective of the client computing system.

FIG. 3 is a flowchart showing an example process 300 for using the predictive analytic platform from the perspective of the client computing system 202. The process 300 would be carried out by the client computing system 202 when the corresponding client entity was uploading the initial training data to the system 206. The client computing system 202 uploads training data (i.e., the initial training data) to the predictive modeling server system 206 over the network 204 (Step 302). In some implementations, the initial training data is uploaded in bulk (e.g., a batch) by the client computing system 202. In other implementations, the initial training data is uploaded incrementally by the client computing system 202 until a threshold volume of data has been received that together forms the "initial training data". The size of the threshold volume can be set by the system 206, the client computing system 202 or otherwise determined. In response, the client computing system 202 receives access to a trained predictive model, for example, trained predictive model 218 (Step 304).

In the implementations shown, the trained predictive model 218 is not itself provided. The trained predictive model 218 resides and executes at a location remote from the client computing system 202. For example, referring back to FIG. 1, the trained predictive model 218 can reside and execute in the data center 112, thereby not using the resources of the client computing system 202. Once the client computing system 202 has access to the trained predictive model 218, the client computing system can send input data and a prediction request to the trained predictive model (Step 306). In response, the client computing system receives a predictive output generated by the trained predictive model from the input data (Step 308).

From the perspective of the client computing system 202, training and use of a predictive model is relatively simple. The training and selection of the predictive model, tuning of the hyper-parameters and features used by the model (to be described below) and execution of the trained predictive model to generate predictive outputs is all done remote from the client computing system 202 without expending client computing system resources. The amount of training data provided can be relatively large, e.g., gigabytes or more, which is often an unwieldy volume of data for a client entity.

Figure 4:
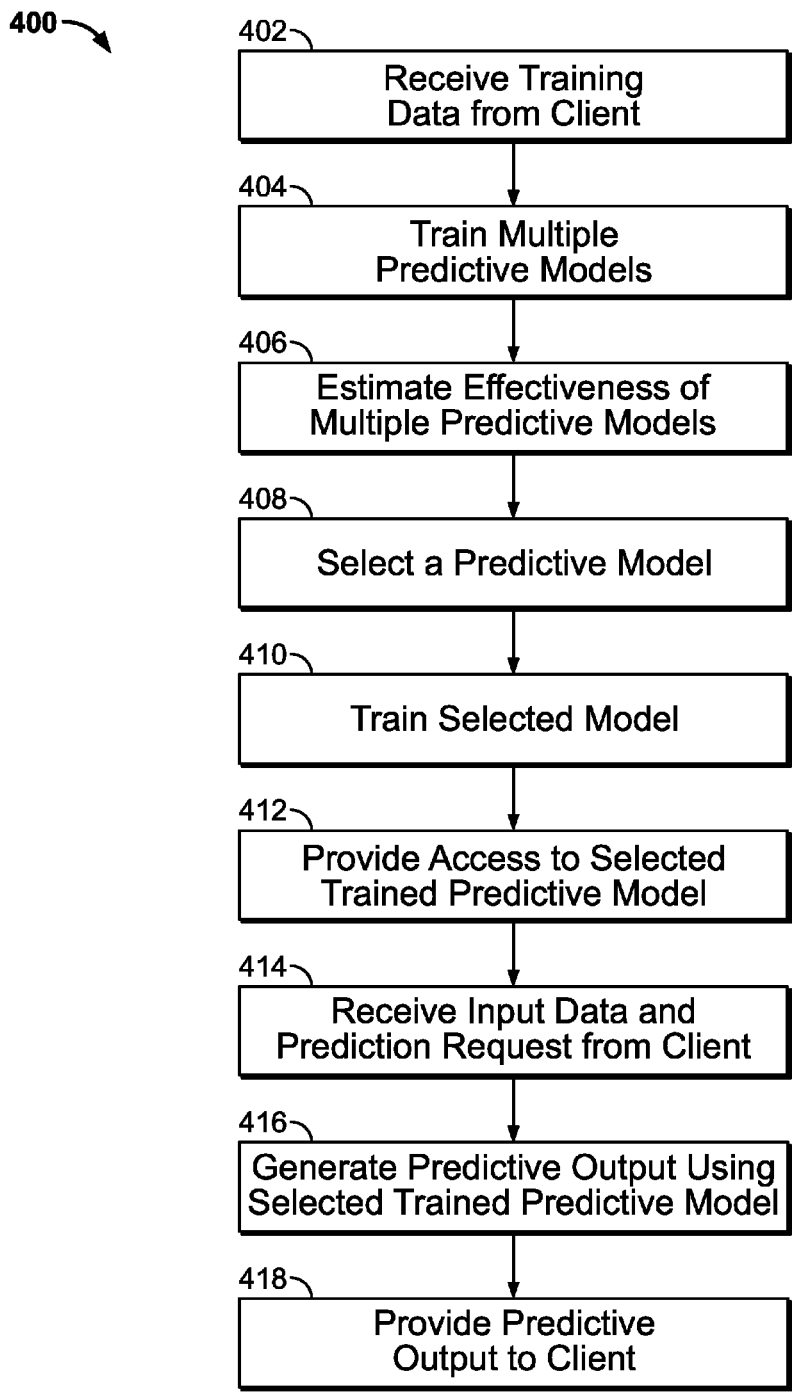
FIG. 4 is a flowchart showing an example process for serving a client computing system using the predictive analytic platform.

The predictive modeling server system 206 will now be described in more detail with reference to the flowchart shown in FIG. 4. FIG. 4 is a flowchart showing an example process 400 for serving a client computing system using the predictive analytic platform. The process 400 is carried out to provide access of a selected trained predictive model to the client computing system, which trained predictive model has been trained using initial training data. Providing accessing to the client computing system of a predictive model that has been retrained using new training data (i.e., training data available after receiving the initial training data) is described below in reference to FIGS. 5 and 6.

Referring to FIG. 4, training data (i.e., initial training data) is received from the client computing system (Step 402). For example, the client computing system 202 can upload the training data to the predictive modeling server system 206 over the network 204 either incrementally or in bulk (i.e., as batch). As describe above, if the initial training data is uploaded incrementally, the training data can accumulate until a threshold volume is received before training of predictive models is initiated. The training data can be in any convenient form that is understood by the modeling server system 206 to define a set of records, where each record includes an input and a corresponding desired output. By way of example, the training data can be provided using a comma-separated value format, or a sparse vector format. In another example, the client computing system 202 can specify a protocol buffer definition and upload training data that complies with the specified definition.

The process 400 and system 200 can be used in various different applications. Some examples include (without limitation) making predictions relating to customer sentiment, transaction risk, species identification, message routing, diagnostics, churn prediction, legal docket classification, suspicious activity, work roster assignment, inappropriate content, product recommendation, political bias, uplift marketing, e-mail filtering and career counseling. For illustrative purposes, the process 400 and system 200 will be described using an example that is typical of how predictive analytics are often used. In this example, the client computing system 202 provides a web-based online shopping service. The training data includes multiple records, where each record provides the online shopping transaction history for a particular customer. The record for a customer includes the dates the customer made a purchase and identifies the item or items purchased on each date. The client computing system 202 is interested in predicting a next purchase of a customer based on the customer's online shopping transaction history.

Various techniques can be used to upload a training request and the training data from the client computing system 202 to the predictive modeling server system 206. In some implementations, the training data is uploaded using an HTTP web service. The client computing system 202 can access storage objects using a RESTful API to upload and to store their training data on the predictive modeling server system 206. In other implementations, the training data is uploaded using a hosted execution platform, e.g., AppEngine available from Google Inc. of Mountain View, Calif. The predictive modeling server system 206 can provide utility software that can be used by the client computing system 202 to upload the data. In some implementations, the predictive modeling server system 206 can be made accessible from many platforms, including platforms affiliated with the predictive modeling server system 206, e.g., for a system affiliated with Google, the platform could be a Google App Engine or Apps Script (e.g., from Google Spreadsheet), and platforms entirely independent of the predictive modeling server system 206, e.g., a desktop application. The training data can be large, e.g., many gigabytes. The predictive modeling server system 206 can include a data store, e.g., the training data repository 214, operable to store the received training data.

The predictive modeling server system 206 includes a repository of training functions for various predictive models, which in the example shown are included in the training function repository 216. At least some of the training functions included in the repository 216 can be used to train an "updateable" predictive model. An updateable predictive model refers to a trained predictive model that was trained using a first set of training data (e.g., initial training data) and that can be used together with a new set of training data and a training function to generate a "retrained" predictive model. The retrained predictive model is effectively the initial trained predictive model updated with the new training data. One or more of the training functions included in the repository 216 can be used to train "static" predictive models. A static predictive model refers to a predictive model that is trained with a batch of training data (e.g., initial training data) and is not updateable with incremental new training data. If new training data has become available, a new static predictive model can be trained using the batch of new training data, either alone or merged with an older set of training data (e.g., the initial training data) and an appropriate training function.

Some examples of training functions that can be used to train a static predictive model include (without limitation): regression (e.g., linear regression, logistic regression), classification and regression tree, multivariate adaptive regression spline and other machine learning training functions (e.g., Naïve Bayes, k-nearest neighbors, Support Vector Machines, Perceptron). Some examples of training functions that can be used to train an updateable predictive model include (without limitation) Online Bayes, Rewritten Winnow, Support Vector Machine (SVM) Analogue, Maximum Entropy (MaxEnt) Analogue, Gradient based (FOBOS) and AdaBoost with Mixed Norm Regularization. The training function repository 216 can include one or more of these example training functions.

Referring again to FIG. 4, multiple predictive models, which can be all or a subset of the available predictive models, are trained using some or all of the training data (Step 404). In the example predictive modeling server system 206, a model training module 212 is operable to train the multiple predictive models. The multiple predictive models include one or more updateable predictive models and can include one or more static predictive models.

The client computing system 202 can send a training request to the predictive modeling server system 206 to initiate the training of a model. For example, a GET or a POST request could be used to make a training request to a URL. A training function is applied to the training data to generate a set of parameters. These parameters form the trained predictive model. For example, to train (or estimate) a Naïve Bayes model, the method of maximum likelihood can be used. A given type of predictive model can have more than one training function. For example, if the type of predictive model is a linear regression model, more than one different training function for a linear regression model can be used with the same training data to generate more than one trained predictive model.

For a given training function, multiple different hyper-parameter configurations can be applied to the training function, again generating multiple different trained predictive models. Therefore, in the present example, where the type of predictive model is a linear regression model, changes to an L1 penalty generate different sets of parameters. Additionally, a predictive model can be trained with different features, again generating different trained models. The selection of features, i.e., feature induction, can occur during multiple iterations of computing the training function over the training data. For example, feature conjunction can be estimated in a forward stepwise fashion in a parallel distributed way enabled by the computing capacity of the predictive modeling server system, i.e., the data center.

Considering the many different types of predictive models that are available, and then that each type of predictive model may have multiple training functions and that multiple hyper-parameter configurations and selected features may be used for each of the multiple training functions, there are many different trained predictive models that can be generated. Depending on the nature of the input data to be used by the trained predictive model to predict an output, different trained predictive models perform differently. That is, some can be more effective than others.

The effectiveness of each of the trained predictive models is estimated (Step 406). For example, a model selection module 210 is operable to estimate the effectiveness of each trained predictive model. In some implementations, cross-validation is used to estimate the effectiveness of each trained predictive model. In a particular example, a 10-fold cross-validation technique is used. Cross-validation is a technique where the training data is partitioned into sub-samples. A number of the sub-samples are used to train an untrained predictive model, and a number of the sub-samples (usually one) is used to test the trained predictive model. Multiple rounds of cross-validation can be performed using different sub-samples for the training sample and for the test sample. K-fold cross-validation refers to portioning the training data into K sub-samples. One of the sub-samples is retained as the test sample, and the remaining K−1 sub-samples are used as the training sample. K rounds of cross-validation are performed, using a different one of the sub-samples as the test sample for each round. The results from the K rounds can then be averaged, or otherwise combined, to produce a cross-validation score. 10-fold cross-validation is commonly used.

In some implementations, the effectiveness of each trained predictive model is estimated by performing cross-validation to generate a cross-validation score that is indicative of the accuracy of the trained predictive model, i.e., the number of exact matches of output data predicted by the trained model when compared to the output data included in the test sub-sample. In other implementations, one or more different metrics can be used to estimate the effectiveness of the trained model. For example, cross-validation results can be used to indicate whether the trained predictive model generated more false positive results than true positives and ignores any false negatives.

In other implementations, techniques other than, or in addition to, cross-validation can be used to estimate the effectiveness. In one example, the resource usage costs for using the trained model can be estimated and can be used as a factor to estimate the effectiveness of the trained model.

In some implementations, the predictive modeling server system 206 operates independently from the client computing system 202 and selects and provides the trained predictive model 218 as a specialized service. The expenditure of both computing resources and human resources and expertise to select the untrained predictive models to include in the training function repository 216, the training functions to use for the various types of available predictive models, the hyper-parameter configurations to apply to the training functions and the feature-inductors all occurs server-side. Once these selections have been completed, the training and model selection can occur in an automated fashion with little or no human intervention, unless changes to the server system 206 are desired. The client computing system 202 thereby benefits from access to a trained predictive model 218 that otherwise might not have been available to the client computing system 202, due to limitations on client-side resources.

Referring again to FIG. 4, each trained model is assigned a score that represents the effectiveness of the trained model.

As discussed above, the criteria used to estimate effectiveness can vary. In the example implementation described, the criterion is the accuracy of the trained model and is estimated using a cross-validation score. Based on the scores, a trained predictive model is selected (Step 408). In some implementations, the trained models are ranked based on the value of their respective scores, and the top ranking trained model is chosen as the selected predictive model. Although the selected predictive model was trained during the evaluation stage described above, training at that stage may have involved only a sample of the training data, or not all of the training data at one time. For example, if k-fold cross-validation was used to estimate the effectiveness of the trained model, then the model was not trained with all of the training data at one time, but rather only K−1 partitions of the training data. Accordingly, if necessary, the selected predictive model is fully trained using the training data (e.g., all K partitions) (Step 410), for example, by the model training module 212. A trained model (i.e., "fully trained" model) is thereby generated for use in generating predictive output, e.g., trained predictive model 218. The trained predictive model 218 can be stored by the predictive modeling server system 206. That is, the trained predictive model 218 can reside and execute in a data center that is remote from the client computing system 202.

Of the multiple trained predictive models that were trained as described above, some or all of them can be stored in the predictive model repository 215. Each trained predictive model can be associated with its respective effectiveness score. One or more of the trained predictive models in the repository 215 are updateable predictive models. In some implementations, the predictive models stored in the repository 215 are trained using the entire initial training data, i.e., all K partitions and not just K−1 partitions. In other implementations, the trained predictive models that were generated in the evaluation phase using K−1 partitions are stored in the repository 215, so as to avoid expending additional resources to recompute the trained predictive models using all K partitions.

Access to the trained predictive model is provided (Step 412) rather than the trained predictive model itself. In some implementations, providing access to the trained predictive model includes providing an address to the client computing system 202 or other user computing platform that can be used to access the trained model; for example, the address can be a URL (Universal Resource Locator). Access to the trained predictive model can be limited to authorized users. For example, a user may be required to enter a user name and password that has been associated with an authorized user before the user can access the trained predictive model from a computing system, including the client computing system 202. If the client computing system 202 desires to access the trained predictive model 218 to receive a predictive output, the client computing system 202 can transmit to the URL a request that includes the input data. The predictive modeling server system 206 receives the input data and prediction request from the client computing system 202 (Step 414). In response, the input data is input to the trained predictive model 218 and a predictive output generated by the trained model (Step 416). The predictive output is provided; it can be provided to the client computing system (Step 418).

In some implementations, where the client computing system is provided with a URL to access the trained predictive model, input data and a request to the URL can be embedded in an HTML document, e.g., a webpage. In one example, JavaScript can be used to include the request to the URL in the HTML document. Referring again to the illustrative example above, when a customer is browsing on the client computing system's web-based online shopping service, a call to the URL can be embedded in a webpage that is provided to the customer. The input data can be the particular customer's online shopping transaction history. Code included in the webpage can retrieve the input data for the customer, which input data can be packaged into a request that is sent in a request to the URL for a predictive output. In response to the request, the input data is input to the trained predictive model and a predictive output is generated. The predictive output is provided directly to the customer's computer or can be returned to the client computer system, which can then forward the output to the customer's computer. The client computing system 202 can use and/or present the predictive output result as desired by the client entity. In this particular example, the predictive output is a prediction of the type of product the customer is most likely to be interested in purchasing. If the predictive output is "blender", then, by way of example, an HTML document executing on the customer's computer may include code that in response to receiving the predictive output cause to display on the customer's computer one or more images and/or descriptions of blenders available for sale on the client computing system's online shopping service. This integration is simple for the client computing system, because the interaction with the predictive modeling server system can use a standard HTTP protocol, e.g. GET or POST can be used to make a request to a URL that returns a JSON (JavaScript Object Notation) encoded output. The input data also can be provided in JSON format.

The customer using the customer computer can be unaware of these operations, which occur in the background without necessarily requiring any interaction from the customer. Advantageously, the request to the trained predictive model can seamlessly be incorporated into the client computer system's web-based application, in this example an online shopping service. A predictive output can be generated for and received at the client computing system (which in this example includes the customer's computer), without expending client computing system resources to generate the output.

In other implementations, the client computing system can use code (provided by the client computing system or otherwise) that is configured to make a request to the predictive modeling server system 206 to generate a predictive output using the trained predictive model 218. By way of example, the code can be a command line program (e.g., using cURL) or a program written in a compiled language (e.g., C, C++, Java) or an interpreted language (e.g., Python). In some implementations, the trained model can be made accessible to the client computing system or other computer platforms by an API through a hosted development and execution platform, e.g., Google App Engine.

In the implementations described above, the trained predictive model 218 is hosted by the predictive modeling server system 206 and can reside and execute on a computer at a location remote from the client computing system 202. However, in some implementations, once a predictive model has been selected and trained, the client entity may desire to download the trained predictive model to the client computing system 202 or elsewhere. The client entity may wish to generate and deliver predictive outputs on the client's own computing system or elsewhere. Accordingly, in some implementations, the trained predictive model 218 is provided to a client computing system 202 or elsewhere, and can be used locally by the client entity.

Components of the client computing system 202 and/or the predictive modeling system 206, e.g., the model training module 212, model selection module 210 and trained predictive model 218, can be realized by instructions that upon execution cause one or more computers to carry out the operations described above. Such instructions can comprise, for example, interpreted instructions, such as script instructions, e.g., JavaScript or ECMAScript instructions, or executable code, or other instructions stored in a computer readable medium. The components of the client computing system 202 and/or the predictive modeling system 206 can be implemented in multiple computers distributed over a network, such as a server farm, in one or more locations, or can be implemented in a single computer device.

As discussed above, the predictive modeling server system 206 can be implemented "in the cloud". In some implementations, the predictive modeling server system 206 provides a web-based service. A web page at a URL provided by the predictive modeling server system 206 can be accessed by the client computing system 202. An operator of the client computing system 202 can follow instructions displayed on the web page to upload training data "to the cloud", i.e., to the predictive modeling server system 206. Once completed, the operator can enter an input to initiate the training and selecting operations to be performed "in the cloud", i.e., by the predictive modeling server system 206, or these operations can be automatically initiated in response to the training data having been uploaded.

The operator of the client computing system 202 can access the one or more trained models that are available to the client computing system 202 from the web page. For example, if more than one set of training data (e.g., relating to different types of input that correspond to different types of predictive output) had been uploaded by the client computing system 202, then more than one trained predictive model may be available to the particular client computing system. Representations of the available predictive models can be displayed, for example, by names listed in a drop down menu or by icons displayed on the web page, although other representations can be used. The operator can select one of the available predictive models, e.g., by clicking on the name or icon. In response, a second web page (e.g., a form) can be displayed that prompts the operator to upload input data that can be used by the selected trained model to provide predictive output data (in some implementations, the form can be part of the first web page described above). For example, an input field can be provided, and the operator can enter the input data into the field. The operator may also be able to select and upload a file (or files) from the client computing system 202 to the predictive modeling server system 206 using the form, where the file or files contain the input data. In response, the selected predicted model can generate predictive output based on the input data provided, and provide the predictive output to the client computing system 202 either on the same web page or a different web page. The predictive output can be provided by displaying the output, providing an output file or otherwise.

In some implementations, the client computing system 202 can grant permission to one or more other client computing systems to access one or more of the available trained predictive models of the client computing system. The web page used by the operator of the client computing system 202 to access the one or more available trained predictive models can be used (either directly or indirectly as a link to another web page) by the operator to enter information identifying the one or more other client computing systems being granted access and possibly specifying limits on their accessibility. Conversely, if the client computing system 202 has been granted access by a third party (i.e., an entity controlling a different client computing system) to access one or more of the third party's trained models, the operator of the client computing system 202 can access the third party's trained models using the web page in the same manner as accessing the client computing system's own trained models (e.g., by selecting from a drop down menu or clicking an icon).

Figure 5:
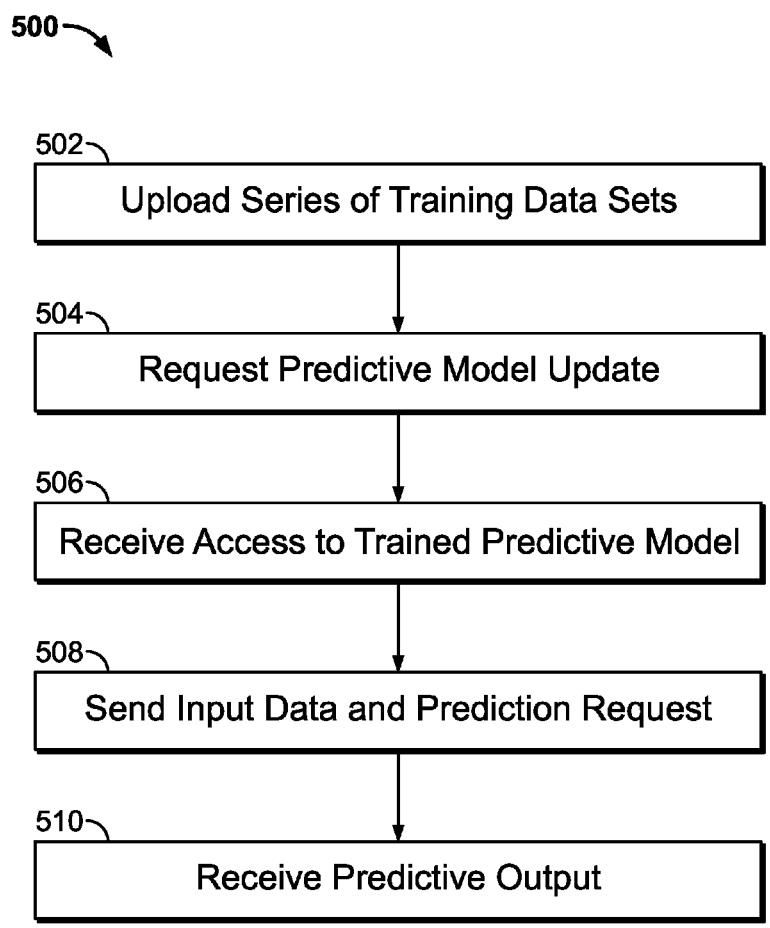
FIG. 5 is a flowchart showing an example process for using the predictive analytic platform from the perspective of the client computing system.

FIG. 5 is a flowchart showing an example process 500 for using the predictive analytic platform from the perspective of the client computing system. For illustrative purposes, the process 500 is described in reference to the predictive modeling server system 206 of FIG. 2, although it should be understood that a differently configured system could perform the process 500. The process 500 would be carried out by the client computing system 202 when the corresponding client entity was uploading the "new" training data to the system 206. That is, after the initial training data had been uploaded by the client computing system and used to train multiple predictive models, at least one of which was then made accessible to the client computing system, additional new training data becomes available. The client computing system 202 uploads the new training data to the predictive modeling server system 206 over the network 204 (Box 502).

In some implementations, the client computing system 202 uploads new training data sets serially. For example, the client computing system 202 may upload a new training data set whenever one becomes available, e.g., on an ad hoc basis. In another example, the client computing system 202 may upload a new training data set according to a particular schedule, e.g., at the end of each day. In some implementations, the client computing system 202 uploads a series of new training data sets batched together into one relatively large batch. For example, the client computing system 202 may upload a new batch of training data sets whenever the batched series of training data sets reach a certain size (e.g., number of megabytes). In another example, the client computing system 202 may upload a new batch of training data sets accordingly to a particular schedule, e.g., once a month.

Table 1 below shows some illustrative examples of commands that can be used by the client computing system 202 to upload a new training data set that includes an individual update, a group update (e.g. multiple examples within an API call), an update from a file and an update from an original file (i.e., a file previously used to upload training data).

TABLE 1

| Type of Update | Command |
| --- | --- |
| Individual Update | curl —X POST —H . . . —d "{\"data\":{\"input\": {\"mixture\": [0, 2]}\"output\":[0]}}" https . . . /bucket%2Ffile.csv/update |
| Individual Update | curl —X POST —H . . . —d "{\"data\":{\"data\": [0, 0, 2]}} https . . . /bucket%2Ffile.csv/update |
| Group Update | curl —X POST —H . . . —d"{\"data\":{\"input\": {\"mixture\":[[0, 2], [1, 2] . . . [x, y]]}\"output\": [0, 1 . . . z]}}" https.../bucket%2Ffile.csv/update |
| Group Update | curl —X POST —H . . . —d"{\"data\":{\"data\": [[0, 0, .2], [1, 1, 2] . . . [z, x, y]]}} https . . . /bucket%2Ffile.csv/update |
| Update from File | curl —X POST —H . . . —d "bucket%2Fnewfile" https . . . /bucket%2Ffile.csv/update |
| Update from Original File | curl —X POST —H . . . https . . . /bucket%2Ffile.csv/update |

In the above example command, "data" refers to data used in training the models (i.e., training data); "mixture" refers to a combination of text and numeric data, "input" refers to data to be used to update the model (i.e., new training data), "bucket" refers to a location where the models to be updated are stored, "x", "y" and "z" refer to other potential data values for a given feature.

The series of training data sets uploaded by the client computing system 202 can be stored in the training data queue 213 shown in FIG. 2. In some implementations, the training data queue 213 accumulates new training data until an update of the updateable trained predictive models included in the predictive model repository 215 is performed. In other implementations, the training data queue 213 only retains a fixed amount of data or is otherwise limited. In such implementations, once the training data queue 213 is full, an update can be performed automatically, a request can be sent to the client computing system 202 requesting instructions to perform an update, or training data in the queue 213 can be deleted to make room for more new training data. Other events can trigger a retraining, as is discussed further below.

The client computing system 202 can request that their trained predictive models be updated (Box 504). For example, when the client computing system 202 uploads the series of training data sets (either incrementally or in batch or a combination of both), an update request can be included or implied, or the update request can be made independently of uploading new training data.

In some implementations, an update automatically occurs upon a condition being satisfied. For example, receiving new training data in and of itself can satisfy the condition and trigger the update. In another example, receiving an update request from the client computing system 202 can satisfy the condition. Other examples are described further in reference to FIG. 5.

As described above in reference to FIGS. 2 and 4, the predictive model repository 215 includes multiple trained predictive models that were trained using training data uploaded by the client computing system 202. At least some of the trained predictive models included in the repository 215 are updateable predictive models. When an update of the updateable predictive models occurs, retrained predictive models are generated using the data in the training data queue 213, the updateable predictive models and the corresponding training functions that were used to train the updateable predictive models. Each retrained predictive model represents an update to the predictive model that was used to generate the retrained predictive model.

Each retrained predictive model that is generated using the new training data from the training data queue 213 can be scored to estimate the effectiveness of the model. That is, an effectiveness score can be generated, for example, in the manner described above. In some implementations, the effective score of a retrained predictive model is determined by tallying the results from the initial cross-validation (i.e., done for the updateable predictive model from which the retrained predictive was generated) and adding in the retrained predictive model's score on each new piece of training data. By way of illustrative example, consider Model A that was trained with a batch of 100 training samples and has an estimated 67% accuracy as determined from cross-validation. Model A then is updated (i.e., retrained) with 10 new training samples, and the retrained Model A gets 5 predictive outputs correct and 5 predictive outputs incorrect. The retrained Model A's accuracy can be calculated as (67+5)/(100+10)=65%.

In some implementations, the effectiveness score of the retrained predictive model is compared to the effectiveness score of the trained predictive model from which the retrained predictive model was derived. If the retrained predictive model is more effective, then the retrained predictive model can replace the initially trained predictive model in the predictive model repository 215. If the retrained predictive model is less effective, then it can be discarded. In other implementations, both predictive models are stored in the repository, which therefore grows in size. In other implementations, the number of predictive models stored in the repository 215 is fixed, e.g., to n models where n is an integer, and only the trained predictive models with the top n effectiveness scores are stored in the repository. Other techniques can be used to decide which trained predictive models to store in the repository 215.

If the predictive model repository 215 included one or more static predictive models, that is, trained predictive models that are not updateable with incremental new training data, then those models are not updated during this update phase (i.e., update phase where an update of only the updateable predictive models is occurring). From the trained predictive models available to the client computing system 202, including the "new" retrained predictive models and the "old" static trained predictive models, a trained predictive model can be selected to provide to the client computing system 202. For example, the effectiveness scores of the available trained predictive models can be compared, and the most effective trained predictive model selected. The client computing system 202 can receive access to the selected trained predictive model (Box 506).

In some instances, the selected trained predictive model is the same trained predictive model that was selected and provided to the client computing system 202 after the trained predictive models in the repository 215 were trained with the initial training data or a previous batch of training data from the training data queue. That is, the most effective trained predictive model from those available may remain the same even after an update. In other instances, a different trained predictive model is selected as being the most effective. Changing the trained predictive model that is accessible by the client computing system 202 can be invisible to the client computing system 202. That is, from the perspective of the client computing system 202, input data and a prediction request is provided to the accessible trained predictive model (Box 508). In response, a predictive output is received by the client computing system 202 (Box 510). The selected trained predictive model is used to generate the predictive output based on the received input. However, if the particular trained predictive model being used system-side changes, this can make no difference from the perspective of the client computing system 202, other than, a more effective model is being used and therefore the predictive output should be correspondingly more accurate as a prediction.

From the perspective of the client computing system 202, updating the updateable trained predictive models is relatively simple. The updating can be all done remote from the client computing system 202 without expending client computing system resources. In addition to updating the updateable predictive models, the static predictive models can be "updated". The static predictive models are not actually "updated", but rather new static predictive models can be generated using training data that includes new training data. Updating the static predictive models is described in further detail below in reference to FIG. 7.

Referring again to FIG. 4, as described above in relation to box 404, multiple different predictive models are trained using the training data from the client. That is, considering the many different types of predictive models that are available, and then that each type of predictive model may have multiple training functions and that multiple hyper-parameter configurations and selected features may be used for each of the multiple training functions, there are many different trained predictive models that can be generated and multiple of these models are trained at this stage. The multiple predictive models are trained in parallel. To achieve efficiency, multiple processes are executed to generate the multiple trained models at the same time independently and simultaneously.

The multiple trained predictive models are trained in parallel and as the training is completed, i.e., a trained model is generated, the trained model is stored. A selection process is then carried out to select the best performing model from the multiple trained models (e.g., Box 408 in FIG. 4), as was described above. Referring again to FIG. 2, the model training module 212 is configured to use training functions from the training function repository 216 and training data from the training data queue 213 to generate trained predictive models. The model selection module 210 is configured to select a model from the set of trained predictive models to make available to the client computing system 202. The multiple trained predictive models are trained in parallel and the model training module 212 is configured such that if one (or more) of the processes executing one of the training functions to train one of the predictive models is faulty, i.e., crashes, the other processes that are running in parallel to train the other predictive models are not affected. A monitoring sub-module 220 is configured to monitor progress of the multiple processes executing the multiple training functions.

In some implementations, the monitoring sub-module 220 is configured to terminate or ignore processes that have not finished executing by the end of a predetermined ultimate runtime. That is, different training functions can converge at different rates to generate trained predictive models. As the processes executing the training functions complete, the monitoring sub-module 220 can store the trained predictive models in the predictive model repository 215 or otherwise. A predetermined ultimate runtime can be set by which the processes executing the multiple training functions must be complete for their respective trained predictive model to be stored, and if a process is not complete by the end of the predetermined ultimate runtime, then the process is terminated. Terminating the process ensures that further computing resources are not expended on the process since any output from the process (i.e., a trained model) will be ignored in any event.

In some implementations, the monitoring sub-module 220 is configured to check the progress of the processes that are executing the training functions at one or more intermediate times before the predetermined ultimate runtime is reached. Checking the progress of the processes early can help to eliminate wasting precious computing resources. That is, a process that is detected early as not succeeding, or identified as unlikely to succeed, can be terminated rather than being allowed to continue until the predetermined ultimate runtime is reached. The convergence of the training function can be assessed at the intermediate time, e.g., by comparing the results of a set of iterations. As the training function converges, the results from one iteration to the next should be less and less different. The level of "difference" between iterations can be measured as a percentage change. That is, if the percentage of change from an iteration to a next iteration is less than a predetermined percentage change after a particular time period of processing, then the process can be identified as progressing normally and allowed to continue. If the percentage change from the iteration to the next iteration is greater than the predetermined percentage change after the particular time period, then the process can be identified as not progressing normally and likely not to converge within the ultimate runtime set for the processes to complete. In other implementations, rather than a percentage change, an absolute numerical value can be used. That is, the results from an iteration and a next iteration can be compared and if the difference exceeds the numerical value, the process can be identified as not likely to converge and if the difference is not exceeded then the process can be allowed to continue. Processes that are allowed to continue after the intermediate check can be allowed to continue until the predetermined ultimate runtime is reached or can be checked again at one or more additional intermediate check times.

In some implementations, if a process is checked at an intermediate check time and is determined to be progressing toward convergence, but once the predetermined ultimate runtime is reached has not yet converged, the monitoring sub-module 220 can be configured to extend the ultimate runtime for the particular process either until convergence is reached, i.e., the process completes, or for a particular additional time period. If the process has not completed by the end of the additional time period, then the process can be terminated without yielding a trained predictive model or the runtime can be further extended. The monitoring sub-module 220 is in effect providing a real time cost/benefit analysis as whether the cost of expending resources to allow the process to continue to execute is worth the benefit. If the process is identified as not converging at a rate that is likely to generate a trained predictive model within the predetermined ultimate runtime, then the benefit is not likely to be realized and the cost can be reduced by terminating the process early. Similarly, if the predetermined ultimate runtime is reached and a process appears near convergence but has not yet completed, in view of the cost already expended, the cost/benefit analysis may determine that allowing an additional period of runtime in order to realize the benefit of the expended cost, i.e., to produce a trained predictive model, is worth the additional cost.

Various techniques can be used to determine the predetermined ultimate runtime. In some implementations, the predetermined ultimate runtime is selected, at least in part, based on the desired accuracy of the trained predictive models that are trained by the processes executing the training functions during the runtime period. The more accuracy that is requested by the client computing system 202, the more iterations that may be required while executing the training functions and/or the more training functions that may be executed, and therefore a longer ultimate runtime. By contrast, if the client computing system 202 wants to quickly access the selected trained predictive model, then less accuracy may be acceptable such that a trained predictive model can be selected and provided to the client computing system 202 more quickly.

In some implementations, the predetermined ultimate runtime is selected, at least in part, on an estimated time to convergence for training functions that are training models with the particular type of training data that has been received. That is, historical information previously collected about how particular training functions perform with different types of training data can be used to estimate how long the training functions will take to converge. In a particular example, the longest estimated time can be selected as the predetermined ultimate runtime, so as to provide enough time for all of the training functions to converge. In another example, the estimated time can be selected that is long enough for at least a given percentage of the training functions to converge, e.g., 90%.

In other implementations, the estimated runtime is not used to select the predetermined ultimate runtime, but is used to decide whether or not to extend the runtime allowed for a particular training function. That is, if at the end of the predetermined ultimate runtime a particular training function has not yet converged, then if the estimated runtime for the particular training function when training with the particular type of training data that has been received is longer than the runtime that has already expired, then the runtime can be extended by an amount of time that meets or exceeds the estimated runtime. Similarly, if the estimated runtime is determined to be less than the runtime that has already expired, then the process can be terminated on the basis that the process most likely will fail if it has not converged by this time.

Figure 6:
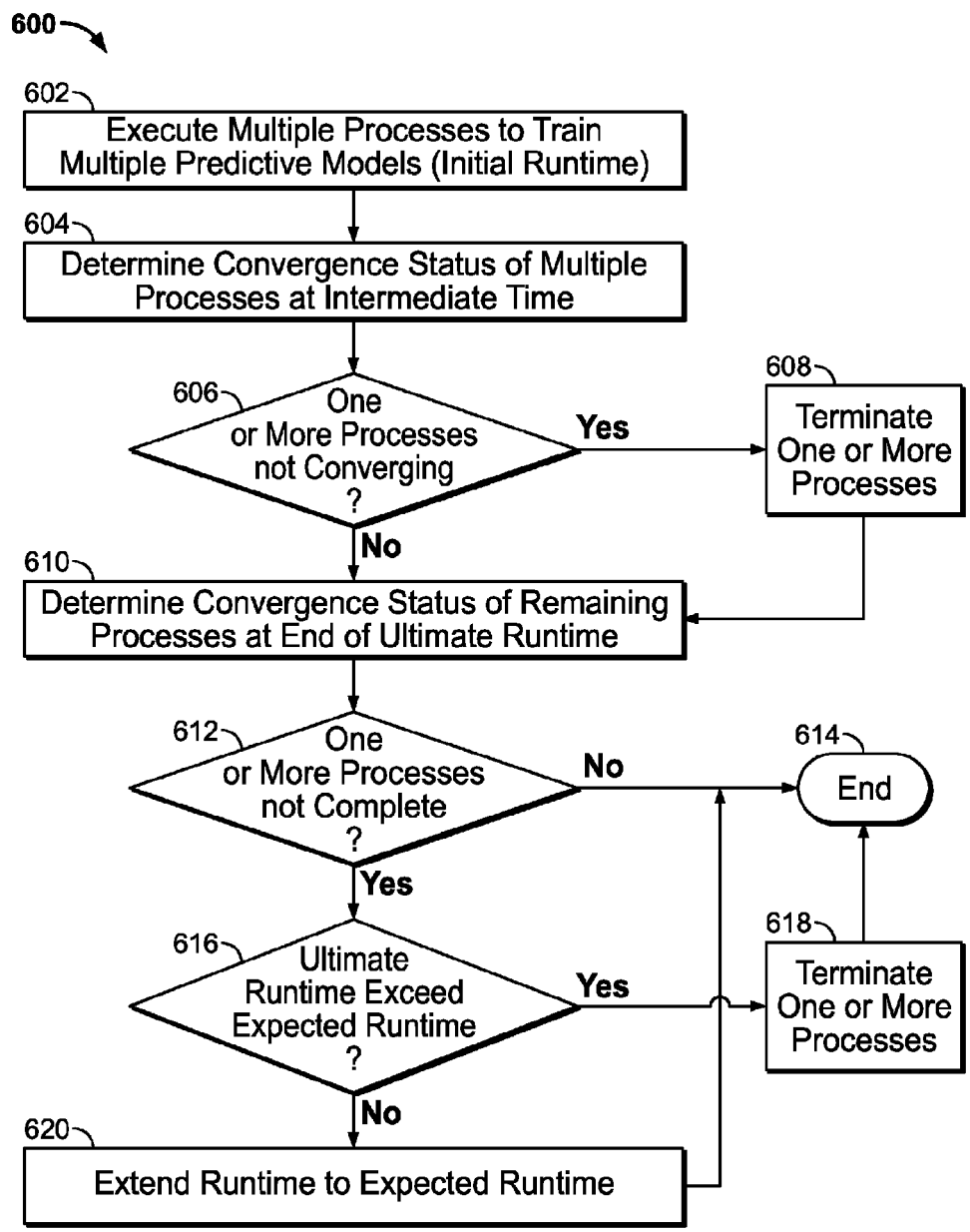
FIG. 6 shows an example process for training multiple predictive models in parallel.

FIG. 6 shows an example process 600 for training multiple predictive models in parallel. The process 600 can be used to carry out the step 404 shown in FIG. 4, although in other implementations the process 600 can be used independent of the process 400. For illustrative purposes, the process 600 is described here in the context of process 400 and the system 200 shown in FIG. 2. However, it should be understood that the process 600 can be implemented using a system that is configured differently than the system 200.

Multiple processes are executed in parallel using training data and multiple training functions for an initial runtime (Box 602). The training data can be training data stored in the training data queue 213 that has been received from the client computing system 202. In another example, the training data can further include some or all of the training data included in the training data repository, for example, if generating a new static trained predictive model using a combination of old and new training data, as compared to retraining an updateable trained predictive model using use new training data from the queue 213. The training functions can be obtained from the training function repository 216.

In this example process 600, the convergence status of the processes is checked at an intermediate time that falls between the end of the initial runtime and the end of the ultimate runtime. At the intermediate time, the convergence status of the multiple processes is checked (Box 604). For example, the monitoring sub-module 220 can compare two or more recently completed iterations of the processes to determine whether the delta between the iterations is within a target range (e.g., a percentage change or an absolute value range). If one or more processes are not converging at the expected rate ("Yes" branch of 606), then the one or more processes can be assumed not likely to converge and are terminated (Box 608) and the process 600 continues for the remaining processes. If there are no processes that are not converging, i.e., all processes are converging at the expected rate ("No" branch of 606), then the process 600 continues for the remaining processes.

The remaining processes continued to execute and at the end of the ultimate runtime the convergence status of the processes can be checked (Box 610). If all the processes converged (i.e., completed) before the end of the ultimate runtime ("No" branch of 612, that is, generated trained predictive models, then the process can end (614) and the trained predictive models can be stored, e.g., in the predictive model repository 215 or otherwise used. If one or more processes are not completed at the end of the ultimate runtime ("Yes" branch of 612), then the expected runtime for the uncompleted processes can be determined and compared to the ultimate runtime. For example, as described above, historical information can be used to profile the expected convergence rates for different types of training functions when training with different types of training data. Based on the type of training data being used and the training functions that have not yet completed, an estimate runtime to convergence can be determined. If for a particular incomplete process the ultimate runtime exceeds the expected runtime ("Yes" branch of 616), then it can be assumed that the process will not converge and the process is terminated (Box 618). If for a particular incomplete process the ultimate runtime does not exceed the expected runtime ("No" branch of 616), then the runtime for the process can be extended to the expected runtime (Box 620). At the end of the expected runtime the process is either completed or can be terminated.

In other implementations, rather than compare the ultimate runtime to an expected runtime, e.g., if an expected runtime is not available, the convergence status can be determined in a similar manner as at Box 604. That is, two or more iterations can be compared to determine the delta between the iterations to estimate whether the process is near convergence. If an incomplete process is determined to be near convergence, then the runtime can be extended by a predetermined time period, following which, if the process is still incomplete, the convergence status can be checked again or the process can be terminated without a further status check.

Referring again to FIG. 4, once the multiple trained predictive models are generated the effectiveness of the models can be estimated (Box 406) and compared to selected a best performing predictive model (Box 408). As was described above, in some implementations, cross-validation can be performed on each of the trained predictive models to determine an estimated effectiveness for each model. In other implementations, for example, when retraining updateable models with newly received training data, prior to retraining, the newly received data can be used to test the updateable models.

As is discussed above, training the multiple predictive models is implemented with multiple processing executing in parallel, i.e., within a distributed environment. One example distributed implementation technique is MapReduce available from Google Inc. of Mountain View, Calif. MapReduce is a programming model and an associated implementation for processing and generating large data sets. Users specify a map function that processes a key/value pair to generate a set of intermediate key/value pairs and a reduce function that merges all intermediate values associate with the same intermediate key. Programs written in this functional style are automatically parallelized and executed on a large cluster of commodity machines. The run-time system can be implemented to partition input data, schedule the program's execution across a set of machines, handle machine failures, and manage inter-machine communication.

In terms of process 600, the map phase of MapReduce includes executing the multiple training functions in parallel to train the multiple trained predictive models using a set of training data. That is, the process 600 can be executed in the map phase. Additionally, the map phase can include executing processes, in parallel, to estimate the effectiveness of the trained predictive models. For example, cross-validation of the trained predictive models can be carried in parallel and in the map phase. The reduce phase can include comparing the estimated effectiveness scores of the multiple trained predictive models and selecting a best performing trained predictive model to provide to, or make accessible to, the client computing system.

FIG. 4 describes a process for training a set of predictive models using a set of initial training data. The resulting trained predictive models that are stored in the predictive model repository 215 can be static trained predictive models and/or updateable trained predictive models, as defined above. As new training data becomes available, e.g., is received from the client computing system 202, the updateable trained predictive models can be retrained using the new training data. The static trained predictive models can be discarded and replaced with newly generated static predictive models that are trained using the new training data and some or all of the initial training data, and in that sense "updated".

Retraining the updateable predictive models and regenerating new static predictive models is described in further detail below with respect to FIG. 7 and FIG. 8.

Figure 7:
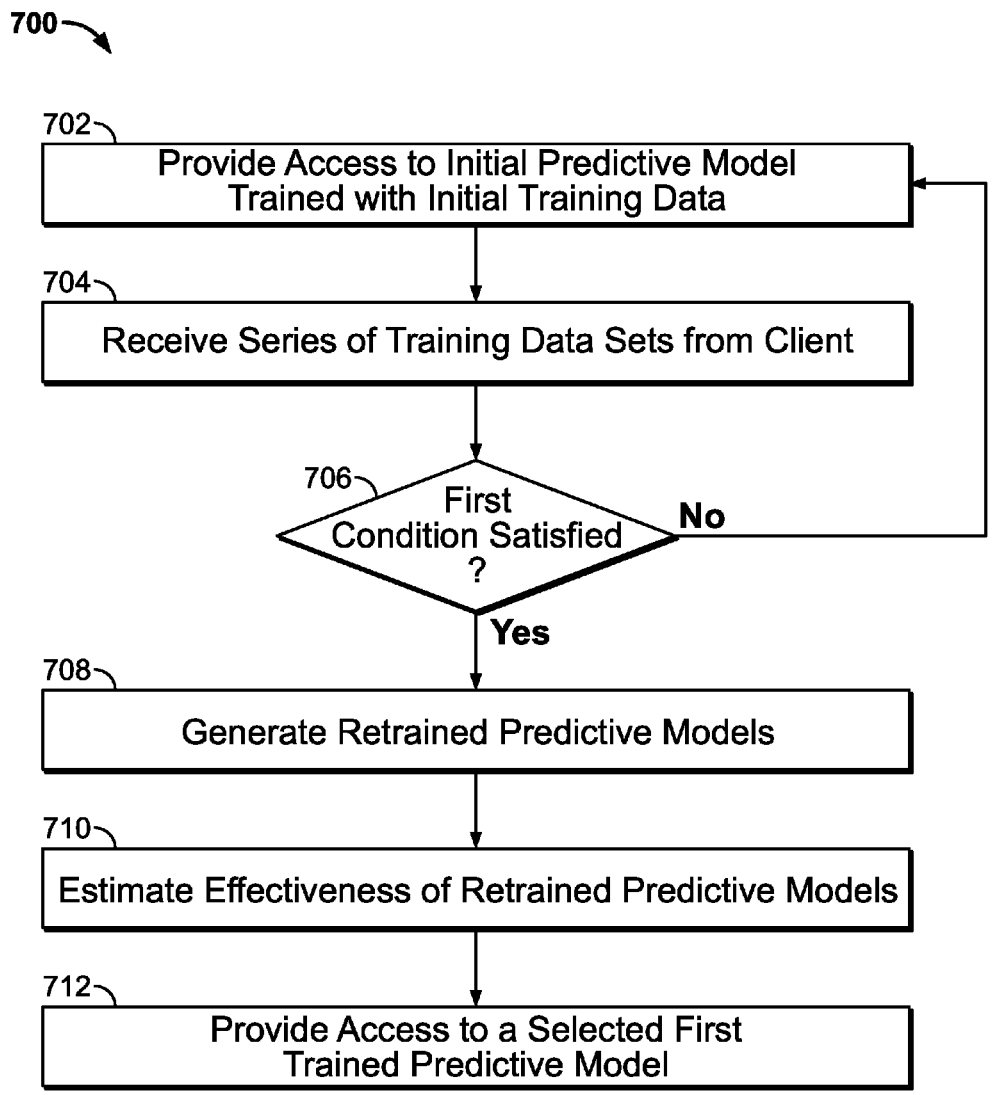
FIG. 7 is a flowchart showing an example process for retraining updateable trained predictive models using the predictive analytic platform.

FIG. 7 is a flowchart showing an example process 700 for retraining updateable trained predictive models using the predictive analytic platform. For illustrative purposes, the process 700 is described in reference to the predictive modeling server system 206 of FIG. 2, although it should be understood that a differently configured system could perform the process 700. The process 700 begins with providing access to an initial trained predictive model (e.g., trained predictive model 218) that was trained with initial training data (Box 702). That is, for example, operations such as those described above in reference to boxes 402-412 of FIG. 4 can have already occurred such that a trained predictive model has been selected (e.g., based on effectiveness) and access to the trained predictive model has been provided, e.g., to the client computing system 202.

A series of training data sets are received from the client computing system 202 (Box 704). For example, as described above, the series of training data sets can be received incrementally or can be received together as a batch. The series of training data sets can be stored in the training data queue 213. When a first condition is satisfied ("yes" branch of box 706), then an update of updateable trained predictive models stored in the predictive model repository 215 occurs. Until the first condition is satisfied ("no" branch of box 706), access can continue to be provided to the initial trained predictive model (i.e., box 602) and new training data can continue to be received and added to the training data queue 213 (i.e., box 704).

The first condition that can trigger can update of updateable trained predictive models can be selected to accommodate various considerations. Some example first conditions were already described above in reference to FIG. 5. That is, receiving new training data in and of itself can satisfy the first condition and trigger the update. Receiving an update request from the client computing system 202 can satisfy the first condition. Other examples of first condition include a threshold size of the training data queue 213. That is, once the volume of data in the training data queue 213 reaches a threshold size, the first condition can be satisfied and an update can occur. The threshold size can be defined as a predetermined value, e.g., a certain number of kilobytes of data, or can be defined as a fraction of the training data included in the training data repository 214. That is, once the amount of data in the training data queue is equal to or exceeds x % of the data used to initially train the trained predictive model 218 or x % of the data in the training data repository 214 (which may be the same, but could be different), the threshold size is reached. In another example, once a predetermine time period has expired, the first condition is satisfied. For example, an update can be scheduled to occur once a day, once a week or otherwise. In another example, if the training data is categorized, then when the training data in a particular category included in the new training data reaches a fraction of the initial training data in the particular category, then the first condition can be satisfied. In another example, if the training data can be identified by feature, then when the training data with a particular feature reaches a fraction of the initial training data having the particular feature, the first condition can be satisfied (e.g., widgets X with scarce property Y). In yet another example, if the training data can be identified by regression region, then when the training data within a particular regression region reaches a fraction of the initial training data in the particular regression region (e.g., 10% more in the 0.0 to 0.1 predicted range), then the first condition can be satisfied. The above are illustrative examples, and other first conditions can be used to trigger an update of the updateable trained predictive models stored in the predictive model repository 215.

The updateable trained predictive models that are stored in the repository 215 are "updated" with the training data stored in the training data queue 213. That is, retrained predictive models are generated (Box 708) using: the training data queue 213; the updateable trained predictive models obtained from the repository 215; and the corresponding training functions that were initially used to train the updateable trained predictive models, which training functions are obtained from the training function repository 216.

The process 600 for generating trained predictive models in parallel described above in reference to FIG. 6 can be used to implement the retraining at step 708. That is, retraining multiple updateable predictive models can be carried out in parallel with multiple processes executing independently and simultaneously as was described above.

The effectiveness of each of the generated retrained predictive models is estimated (Box 710). The effectiveness can be estimated, for example, in the manner described above in reference to FIG. 5 and an effectiveness score for each retrained predictive model can be generated.

A trained predictive model is selected from the multiple trained predictive models based on their respective effectiveness scores. That is, the effectiveness scores of the retrained predictive models and the effectiveness scores of the trained predictive models already stored in the repository 215 can be compared and the most effective model, i.e., a first trained predictive model, selected. Access is provided to the first trained predictive model to the client computing system 202 (Box 712). As was discussed above, in some implementations, the effectiveness of each retrained predictive model can be compared to the effectiveness of the updateable trained predictive model from which it was derived, and the most effective of the two models stored in the repository 215 and the other discarded. In some implementations, this step can occur first and then the effectiveness scores of all of the models stored in the repository 215 can be compared and the first trained predictive model selected. As was also discussed above, the first trained predictive model may end up being the same model as the initial trained predictive model that was provided to the client computing system 202 in Box 702. That is, even after the update, the initial trained predictive model may still be the most effective model. In other instances, a different trained predictive model may end up being the most effective, and therefore the trained predictive model to which the client computing system 202 has access changes after the update.

Of the multiple retrained predictive models that were trained as described above, some or all of them can be stored in the predictive model repository 215. In some implementations, the predictive models stored in the repository 215 are trained using the entire new training data, i.e., all K partitions and not just K−1 partitions. In other implementations, the trained predictive models that were generated in an evaluation phase using K−1 partitions are stored in the repository 215, so as to avoid expending additional resources to recomputed the trained predictive models using all K partitions.

In the implementations described above, the first trained predictive model is hosted by the dynamic predictive modeling server system 206 and can reside and execute on a computer at a location remote from the client computing system 202. However, as described above in reference to FIG. 4, in some implementations, once a predictive model has been selected and trained, the client entity may desire to download the trained predictive model to the client computing system 202 or elsewhere. The client entity may wish to generate and deliver predictive outputs on the client's own computing system or elsewhere. Accordingly, in some implementations, the first trained predictive model 218 is provided to a client computing system 202 or elsewhere, and can be used locally by the client entity.

Figure 8:
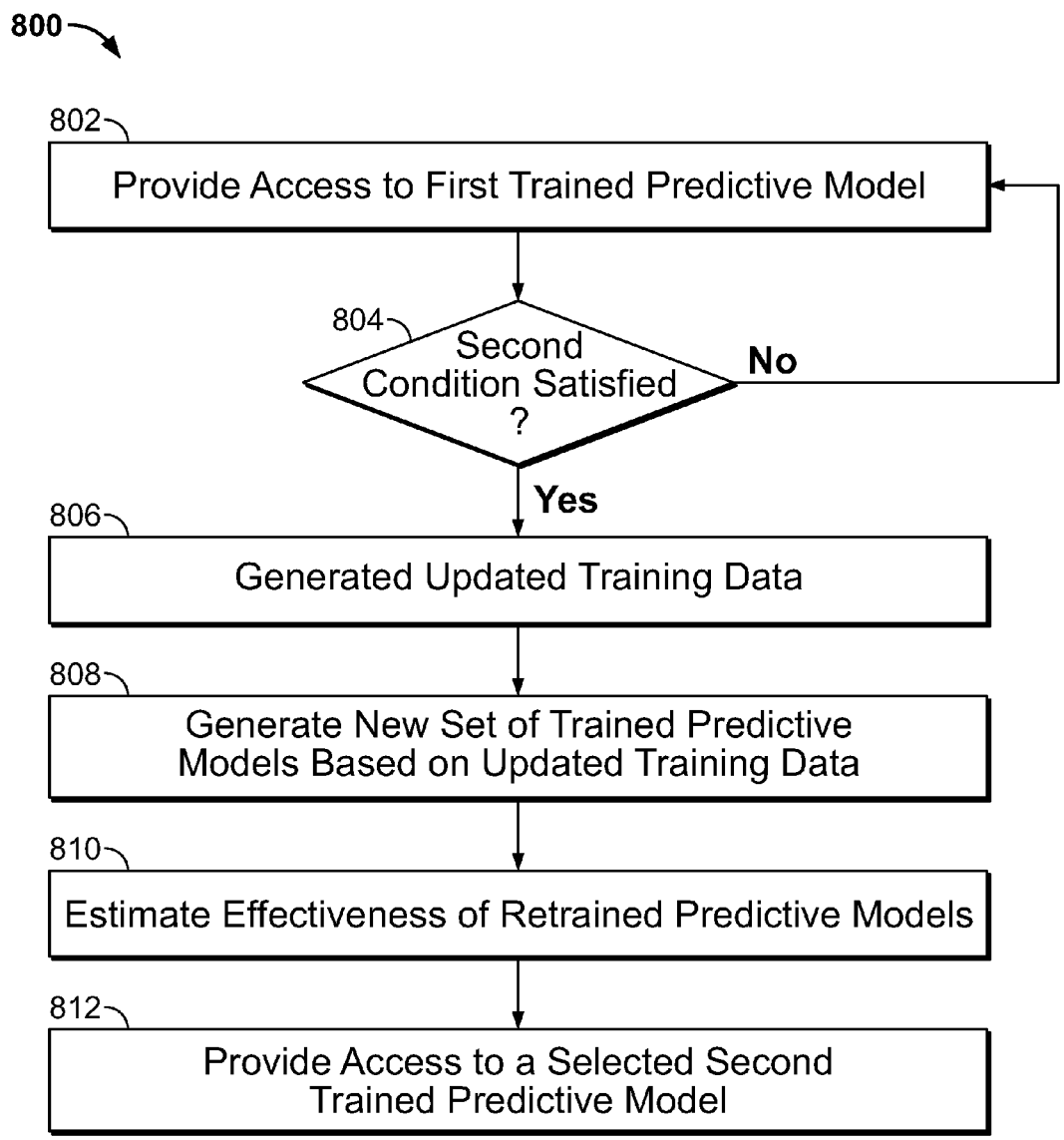
FIG. 8 is a flowchart showing an example process for generating a new set of trained predictive models using updated training data.

FIG. 8 is a flowchart showing an example process 800 for generating a new set of trained predictive models using updated training data. For illustrative purposes, the process 800 is described in reference to the predictive modeling server system 206 of FIG. 2, although it should be understood that a differently configured system could perform the process 800. The process 800 begins with providing access to a first trained predictive model (e.g., trained predictive model 218) (Box 802). That is, for example, operations such as those described above in reference to boxes 702-712 of FIG. 7 can have already occurred such that the first trained predictive model has been selected (e.g., based on effectiveness) and access to the first trained predictive model has been provided, e.g., to the client computing system 202. In another example, the first trained predictive model can be a trained predictive model that was trained using the initial training data. That is, for example, operations such as those described above in reference to boxes 402-412 of FIG. 4 can have already occurred such that a trained predictive model has been selected (i.e., the first trained predictive model) and access to the first trained predictive model has been provided. Typically, the process 800 occurs after some updating of the updateable trained predictive models has already occurred (i.e., after process 700), although that is not necessarily the case.

Referring again to FIG. 8, when a second condition is satisfied ("yes" branch of box 804), then an "update" of some or all the trained predictive models stored in the predictive model repository 215 occurs, including the static trained predictive models. This phase of updating is more accurately described as a phase of "regeneration" rather than updating. That is, the trained predictive models from the repository 215 are not actually updated, but rather a new set of trained predictive models are generated using different training data then was used to initially train the models in the repository (i.e., the different than the initial training data in this example).

Updated training data is generated (Box 806) that will be used to generate the new set of trained predictive models. In some implementations, the training data stored in the training data queue 213 is added to the training data that is stored in the training data repository 214. The merged set of training data can be the updated training data. Such a technique can work well if there are no constraints on the amount of data that can be stored in the training data repository 214. However, in some instances there are such constraints, and a data retention policy can be implemented to determine which training data to retain and which to delete for purposes of storing training data in the repository 214 and generating the updated training data. The data retention policy can define rules governing maintaining and deleting data. For example, the policy can specify a maximum volume of training data to maintain in the training data repository, such that if adding training data from the training data queue 213 will cause the maximum volume to be exceeded, then some of the training data is deleted. The particular training data that is to be deleted can be selected based on the date of receipt (e.g., the oldest data is deleted first), selected randomly, selected sequentially if the training data is ordered in some fashion, based on a property of the training data itself, or otherwise selected.

For illustrative purposes, in one example the updated training data can be generated by combining the training data in the training data queue together with the training data already stored in the training data repository 216 (e.g., the initial training data). In some implementations, the updated training data can then be stored in the training data repository 214 and can replace the training data that was previously stored (to the extent that the updated training data is different). In some implementations, the training data queue 213 can be cleared to make space to new training data to be received in the future.

A new set of trained predictive models is generated using the updated training data and using training functions that are obtained from the training function repository 216 (Box 808). The new set of trained predictive models includes at least some updateable trained predictive models and can include at least some static trained predictive models.

The process 600 for generating trained predictive models in parallel described above in reference to FIG. 6 can be used to implement the step 808 of generating a new set of trained predictive models. That is, the new set of trained predictive models can be generated in parallel with multiple processes executing independently and simultaneously as was described above.

The effectiveness of each trained predictive model in the new set can be estimated, for example, using techniques described above (Step 810). In some implementations, an effectiveness score is generated for each of the new trained predictive models. In some implementations, the effectiveness score can be based on the accuracy of the trained predictive model as tested using new training data (i.e., training data that has not yet been used to train the model) before the trained predictive model is retrained using the new training data.

A second trained predictive model can be selected to which access is provided to the client computing system 202 (Box 812). In some implementations, the effectiveness scores of the new trained predictive models and the trained predictive models stored in the repository 215 before this updating phase began are all compared and the most effective trained predictive model is selected as the second trained predictive model. In some implementations, the trained predictive models that were stored in the repository 215 before this updating phase began are discarded and replaced with the new set of trained predictive models, and the second trained predictive model is selected from the trained predictive models currently stored in the repository 215. In some implementations, the static trained predictive models that were stored in the repository 215 before the updating phase began are replaced by their counterpart new static trained predictive models. The updateable trained predictive models that were stored in the repository 215 before the updating phase are either replaced by their counterpart new trained predictive model or maintained, depending on which of the two is more effective. The second trained predictive model then can be selected from among the trained predictive models stored in the repository 215.

In some implementations, only a predetermined number of predictive models are stored in the repository 215, e.g., n (where n is an integer greater than 1), and the trained predictive models with the top n effectiveness scores are selected from among the total available predictive models, i.e., from among the new set of trained predictive models and the trained predictive models that were stored in the repository 215 before the updating phase began. Other techniques can be used to determine which trained predictive models to store in the repository 215 and which pool of trained predictive models is used from which to select the second trained predictive model.

Referring again to Box 804, until the second condition is satisfied which triggers the update of all models included in the repository 215 with updated training data ("No" branch of box 804), the client computing system 202 can continue to be provided access to the first trained predictive model.

Various implementations of the systems and techniques described here may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and may be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here may be implemented on a computer having a display device (e.g., a CRT (cathode ray tube) or LCD (liquid crystal display) monitor) for displaying information to the user and a keyboard and a pointing device (e.g., a mouse or a trackball) by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

The systems and techniques described here may be implemented in a computing system that includes a back end component (e.g., as a data server), or that includes a middleware component (e.g., an application server), or that includes a front end component (e.g., a client computer having a graphical user interface or a Web browser through which a user may interact with an implementation of the systems and techniques described here), or any combination of such back end, middleware, or front end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

A number of embodiments have been described. Nevertheless, it will be understood that various modifications may be made without departing from the spirit and scope of the invention.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A computer-implemented method comprising:
receiving training data for predictive modeling;
setting an ultimate time by which each of a plurality of processes executing training functions to generate respective trained predictive models is to be completed;
executing the plurality of processes simultaneously in parallel to generate the trained predictive models using the training data;
determining, after executing each of the plurality of processes for an initial time that is earlier than the ultimate time, a respective convergence status of each of the plurality of processes, wherein the convergence status indicates a likelihood that the process will converge, and based on the determination, identifying one or more processes that are not likely to converge, terminating processes that are not likely to converge, and allowing the remaining processes to continue executing;
after the ultimate time has been reached, terminating processes that have not yet converged and generating an effectiveness score for each of a plurality of trained predictive models that were generated by the remaining processes, wherein the effectiveness score for a particular trained predictive model represents an estimation of the effectiveness of the particular trained predictive model;
storing the plurality of trained predictive models in a repository of trained predictive models;
receiving input data and a prediction request;

selecting, for use in servicing the prediction request, a first trained predictive model from among the plurality of trained predictive models based on their respective effectiveness scores;

providing the input data to the first trained predictive model; and receiving a predictive output from the first trained predictive model.

2. The method of claim 1, wherein the training data is received from a client computing system over a network, the method further comprising:

providing the client computing system access to the first trained predictive model in the repository of trained predictive models over the network.

3. The method of claim 1, wherein determining the respective convergence status of each of the plurality of processes comprises:

determining a difference between two or more training iterations and comparing the difference to a predetermined threshold value; and determining that the process is unlikely to converge if the difference exceeds the threshold value, and otherwise, determining that the process is likely to converge if the difference is less than the threshold value.

4. The method of claim 3, wherein the difference is a percentage change between two iterations and the predetermined threshold value is expressed as a percentage change.

5. The method of claim 3, wherein the difference is an absolute numerical value change between two iterations and the predetermined threshold value is expressed as a numerical value.

6. The method of claim 1, wherein after the ultimate time has been reached but before terminating processes that have not yet converged, the method further comprises:

for each process that has not yet converged, estimating a time to convergence and allowing the process to continue executing for the estimated time.

7. The method of claim 1, wherein after the ultimate time has been reached but before terminating processes that have not yet converged, the method further comprises:

for each process that has not yet converged, determining a difference between two or more training iterations and comparing the difference to a predetermined threshold value; and terminating the process if the difference exceeds the threshold value, and otherwise, allowing the process to continues executing.

8. The method of claim 1, wherein generating an effectiveness score for each of the plurality of trained predictive models comprises:

partitioning the training data into k partitions, performing k-fold cross-validation and generating a cross-validation score for each of the plurality of trained predictive models that indicates the effectiveness of the trained predictive model, where k is an integer greater than 1.

9. The method of claim 1, further comprising:

obtaining one or more updateable trained predictive models from a predictive model repository, wherein the received training data is different than initial training data that was used with one or more training functions to train the one or more updateable trained predictive models; and wherein executing the plurality of processes simultaneously in parallel to generate the plurality of trained predictive models using the training data and a plurality of training functions includes executing one or more processes to generate one or more retrained predictive models using the training data, the one or more updateable trained predictive models and the one or more training functions used to train said updateable trained predictive models.

10. A computer-implemented system comprising:

one or more computers;

one or more data storage devices coupled to the one or more computers, storing:

a repository of training functions, and instructions that, when executed by the one or more computers, cause the one or more computers to perform operations comprising:

receiving training data for predictive modeling;

setting an ultimate time by which each of a plurality of processes executing training functions obtained from the repository of training functions to generate respective trained predictive models is to be completed;

executing the plurality of processes simultaneously in parallel to generate the trained predictive models using the training data;

determining, after executing each of the plurality of processes for an initial time that is earlier than the ultimate time, a respective convergence status of each of the plurality of processes, wherein the convergence status indicates a likelihood that the process will converge, and based on the determination, identifying one or more processes that are not likely to converge, terminating processes that are not likely to converge, and allowing the remaining processes to continue executing;

after the ultimate time has been reached, terminating processes that have not yet converged, and generating an effectiveness score for each of a plurality of trained predictive models that were generated by the remaining processes, wherein the effectiveness score for a particular trained predictive model represents an estimation of the effectiveness of the particular trained predictive model;

storing the plurality of trained predictive models in a repository of trained predictive models;

receiving input data and a prediction request;

selecting, for use in servicing the prediction request, a first trained predictive model from among the plurality of trained predictive models based on their respective effectiveness scores;

providing the input data to the first trained predictive model; and receiving a predictive output from the first trained predictive model.

11. The system of claim 10, wherein the training data is received from the client computing system over a network, the operations further comprising:

providing the client computing system access to the first trained predictive model in the repository of trained predictive models over the network.

12. The system of claim 10, wherein determining the respective a convergence status of each of the plurality of processes comprises:

determining a difference between two or more training iterations and comparing the difference to a predetermined threshold value; and determining that the process is unlikely to converge if the difference exceeds the threshold value, and otherwise, determining that the process is likely to converge if the difference is less than the threshold value.

13. The system of claim 12, wherein the difference is a percentage change between two iterations and the predetermined threshold value is expressed as a percentage change.

14. The system of claim 12, wherein the difference is an absolute numerical value change between two iterations and the predetermined threshold value is expressed as a numerical value.

15. The system of claim 10, wherein after the ultimate time has been reached but before terminating processes that have not yet converged, the operations further comprises:
for each process that has not yet converged, estimating a time to convergence and allowing the process to continue executing for the estimated time.

16. The system of claim 10, wherein after the ultimate time has been reached but before terminating processes that have not yet converged, the operations further comprise:
for each process that has not yet converged,
determining a difference between two or more training iterations and comparing the difference to a predetermined threshold value; and
terminating the process if the difference exceeds the threshold value, and otherwise allowing the process to continue executing.

17. The system of claim 10, wherein generating an effectiveness score for each of the plurality of trained predictive models comprises:
partitioning the training data into k partitions, performing k-fold cross-validation and generating a cross-validation score for each of the plurality of trained predictive models that indicates the effectiveness of the trained predictive model, where k is an integer greater than 1.

18. The system of claim 10, the operations further comprising:
obtaining one or more updateable trained predictive models from a predictive model repository, wherein the received training data is different than initial training data that was used with one or more training functions to train the one or more updateable trained predictive models; and
wherein executing the plurality of processes simultaneously in parallel to generate the plurality of trained predictive models using the training data and a plurality of training functions includes executing one or more processes to generate one or more retrained predictive models using the training data, the one or more updateable trained predictive models and the one or more training functions used to train said updateable trained predictive models.

19. A computer-readable storage device encoded with a computer program product, the computer program product comprising instructions that when executed on one or more computers cause the one or more computers to perform operations implementing a predictive model training system, the operations comprising:
receiving training data for predictive modeling;
setting an ultimate time by which each of a plurality of processes executing training functions to generate respective trained predictive models is to be completed;
executing the plurality of processes simultaneously in parallel to generate the trained predictive models using the training data;
determining, after executing each of the plurality of processes for an initial time that is earlier than the ultimate time, a respective convergence status of each of the plurality of processes, wherein the convergence status indicates a likelihood that the process will converge, and based on the determination identifying one or more processes that are not likely to converge, terminating processes that are not likely to converge, and allowing the remaining processes to continue executing;
after the ultimate time has been reached, terminating processes that have not yet converged, and generating an effectiveness score for each of a plurality of trained predictive models that were generated by the remaining processes, wherein the effectiveness score for a particular trained predictive model represents an estimation of the effectiveness of the particular trained predictive model;
storing the plurality of trained predictive models in a repository of trained predictive models;
receiving input data and a prediction request;
selecting, for use in servicing the prediction request, a first trained predictive model from among the plurality of trained predictive models based on their respective effectiveness scores;
providing the input data to the first trained predictive model; and
receiving a predictive output from the first trained predictive model.

20. The computer-readable storage device of claim 19, wherein the training data is received from the client computing system over a network, the operations further comprising:
providing the client computing system access to the first trained predictive model in the repository of trained predictive models over the network.

21. The computer-readable storage device of claim 19, wherein determining the respective convergence status of each of the plurality of processes comprises:
determining a difference between two or more training iterations and comparing the difference to a predetermined threshold value; and
determining that the process is unlikely to converge if the difference exceeds the threshold value, and otherwise, determining that the process is likely to converge if the difference is less than the threshold value.

22. The computer-readable storage device of claim 21, wherein the difference is a percentage change between two iterations and the predetermined threshold value is expressed as a percentage change.

23. The computer-readable storage device of claim 21, wherein the difference is an absolute numerical value change between two iterations and the predetermined threshold value is expressed as a numerical value.

24. The computer-readable storage device of claim 19, wherein after the ultimate time has been reached but before terminating processes that have not yet converged, the operations further comprises:
for each process that has not yet converged, estimating a time to convergence and allowing the process to continue executing for the estimated time.

25. The computer-readable storage device of claim 19, wherein after the ultimate time has been reached but before terminating processes that have not yet converged, the operations further comprise:
for each process that has not yet converged,
determining a difference between two or more training iterations and comparing the difference to a predetermined threshold value; and
terminating the process if the difference exceeds the threshold value, and otherwise, allowing the process to continue executing.

26. The computer-readable storage device of claim 19, wherein generating an effectiveness score for each of the plurality of trained predictive models comprises:

partitioning the training data into k partitions, performing k-fold cross-validation and generating a cross-validation score for each of the plurality of trained predictive models that indicates the effectiveness of the trained predictive model, where k is an integer greater than 1.

27. The computer-readable storage device of claim 19, the operations further comprising:

obtaining one or more updateable trained predictive models from a predictive model repository, wherein the received training data is different than initial training data that was used with one or more training functions to train the one or more updateable trained predictive models; and wherein executing the plurality of processes simultaneously in parallel to generate the plurality of trained predictive models using the training data and a plurality of training functions includes executing one or more processes to generate one or more retrained predictive models using the training data, the one or more updateable trained predictive models and the one or more training functions used to train said updateable trained predictive models.

* * * * *

UNITED STATES PATENT AND TRADEMARK OFFICE
CERTIFICATE OF CORRECTION

PATENT NO. : 8,489,632 B1
APPLICATION NO. : 13/171423
DATED : July 16, 2013
INVENTOR(S) : Jordan M. Breckenridge et al.

Page 1 of 1

It is certified that error appears in the above-identified patent and that said Letters Patent is hereby corrected as shown below:

Title Page 2, under item (56), Other Publications, Column 2, Line 24 – delete "Techonological" and insert -- Technological --, therefor.

In the Claims:

Claim 12, Column 26, Line 59 – after "respective" delete "a".

Signed and Sealed this
Twenty-second Day of October, 2013

Teresa Stanek Rea
*Deputy Director of the United States Patent and Trademark Office*